US012222929B2

(12) United States Patent
Salpekar et al.

(10) Patent No.: US 12,222,929 B2
(45) Date of Patent: *Feb. 11, 2025

(54) SYSTEM AND METHOD FOR HANDLING IMPLICIT TRANSACTIONS IN A HYBRID CLOUD CACHE

(71) Applicant: Egnyte, Inc., Mountain View, CA (US)

(72) Inventors: Ajay Salpekar, Mountain View, CA (US); Bhaskar Guthikonda, Mountain View, CA (US); Sanjay Kulkarni, Mountain View, CA (US); Yogesh Kulkarni, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,844

(22) Filed: Jun. 7, 2023

(65) Prior Publication Data

US 2023/0409562 A1 Dec. 21, 2023

Related U.S. Application Data

(63) Continuation of application No. 17/349,531, filed on Jun. 16, 2021, now Pat. No. 11,714,803.

(60) Provisional application No. 63/040,255, filed on Jun. 17, 2020.

(51) Int. Cl.
*G06F 16/23* (2019.01)
*G06F 16/22* (2019.01)
*H04L 67/1097* (2022.01)
*H04L 67/568* (2022.01)

(52) U.S. Cl.
CPC ...... *G06F 16/2379* (2019.01); *G06F 16/2246* (2019.01); *H04L 67/1097* (2013.01); *H04L 67/568* (2022.05)

(58) Field of Classification Search
CPC ............ G06F 16/2379; G06F 16/2246; H04L 67/568; H04L 67/1097
See application file for complete search history.

(56) References Cited

U.S. PATENT DOCUMENTS

| | | | |
|---|---|---|---|
| 9,424,185 B1 | 8/2016 | Botelho et al. | |
| 10,127,238 B1* | 11/2018 | Bent | ..................... G06F 16/148 |
| 10,630,772 B2 | 4/2020 | Jung et al. | |
| 10,893,120 B2 | 1/2021 | Seelam et al. | |
| 11,061,868 B1 | 7/2021 | Popovich et al. | |

(Continued)

*Primary Examiner* — Huawen A Peng
(74) *Attorney, Agent, or Firm* — Pierson Ferdinand, LLP; Jeffrey R. Ambroziak (57) ABSTRACT

A system for handling Implicit transactions in a hybrid cloud cache. The hybrid cloud cache maintains folders in a metadata file system that includes a hierarchy of cached folders, and maintains a meta-file containing metadata of files and folders. The system obtains a meta-file from a cloud platform and compares that to a meta-file obtained from the hybrid cloud cache. An object associated with an Implicit metadata transaction is transferred to an internal namespace of the hybrid cloud cache if the comparison indicates that certain conditions are met. The system may perform a bottom-up traversal of the namespace and may abort the traversal if an outstanding explicit transaction for the object is present or the object exists in the cloud platform. An object may be moved to a temporary storage location if there is no explicit transaction on it and the object does not exist in the cloud platform.

20 Claims, 4 Drawing Sheets

(56) References Cited

U.S. PATENT DOCUMENTS

| | | | |
|---|---|---|---|
| 11,194,763 B1 | 12/2021 | Grider | |
| 11,228,509 B2* | 1/2022 | Baljeu | H04L 41/5054 |
| 11,334,540 B2 | 5/2022 | Yammine et al. | |
| 11,558,459 B2* | 1/2023 | Lamba | H04L 67/1097 |
| 2013/0159451 A1* | 6/2013 | Luciw | H04L 67/568 |
| | | | 709/213 |
| 2014/0324925 A1 | 10/2014 | Krishnamurthy | |
| 2017/0140025 A1* | 5/2017 | Milvaney | G06Q 10/101 |
| 2019/0129802 A1 | 5/2019 | Laier et al. | |
| 2019/0356566 A1* | 11/2019 | Bharatkumar | H04L 41/069 |
| 2020/0084106 A1* | 3/2020 | Johnson | H04L 67/10 |
| 2020/0089607 A1 | 3/2020 | Gaonkar et al. | |
| 2020/0242086 A1 | 7/2020 | Mamidi et al. | |
| 2020/0244756 A1* | 7/2020 | Trachy | G06F 21/64 |
| 2021/0342298 A1 | 11/2021 | Mathews et al. | |

* cited by examiner

SYSTEM AND METHOD FOR HANDLING IMPLICIT TRANSACTIONS IN A HYBRID CLOUD CACHE

CROSS REFERENCE TO RELATED APPLICATION

This application claims the benefit of U.S. Provisional Application No. 63/040,255, titled "System And Method For Handling Implicit Transactions In A Hybrid Cloud Cache," filed Jun. 17, 2020, the disclosure of which is incorporated, in its entirety herein, by this reference.

FIELD OF THE DISCLOSURE

The present application relates to cloud technologies, data storage technologies, synchronization technologies, caching technologies, transaction handling technologies, data consistency and integrity technologies, and more particularly, to a system and method for handling Implicit transactions in a hybrid cloud cache.

BACKGROUND

A hybrid cloud is a computing architecture that combines an on-premise data center with a public cloud environment. Hybrid cloud caches are local data storage elements used in conjunction with a public cloud-based data storage and serve as an important component of internet applications, as they help achieve improved throughput and increased data access speeds. Conventionally, such caches persist data and metadata regarding operations or transactions on a local file system. The integrity of data stored locally by a hybrid cloud cache may be ensured by implementing a journaling system, where a system adds records representing user requested operations and the associated transactions to a journal. Thus, the journaling system may be a data storage location where records are added to represent operations initiated by a user or by a computing system at the direction of a user, and the backing store for a journal may comprise disk blocks. Journals may also be referred to as logs and the two terms are often used interchangeably.

When using a journal, user requested operations and the associated transactions are typically described using as little storage space as possible. At a high level, such operations may be classified into two types or categories of operations. The first type of operation may comprise data operations, which typically involve the local cache being used to upload data or files to, or download data or files from, the cloud system or platform. The second type of operation may comprise metadata operations, which typically involve the local cache being used to perform operations where data itself is not involved. For example, such metadata operations may include, but are not limited to, data or file rename and delete operations.

With the evolution of cloud-file-sharing technologies and the tremendous growth of data both in terms of the number of files and the sizes of the files, hybrid cloud caches and systems are becoming an increasingly important aspect in technological and service advancements in the cloud-file-sharing space. Hybrid cloud caches serve as an important component of internet applications as they may be used to achieve better throughput and increased access speeds. Hybrid cloud caches typically persist data and metadata on a local file system. Operations that are performed by hybrid cloud cache users (and hence locally in the cache) are referred to as Explicit transactions, while operations that are performed directly in the cloud (i.e., directly using a cloud-based platform) are referred to as Implicit transactions. Both Explicit and Implicit transactions can further be classified as data or metadata transactions.

Implicit data transactions do not require updates to the metadata cached by the hybrid cloud cache. Additionally, Implicit metadata transactions on objects not cached by the hybrid cloud cache do not require further action. However, in the case of Implicit metadata transactions on objects cached by the hybrid cloud cache, the following potentially complex situations may exist: firstly, there may be outstanding Explicit transactions on these objects or on objects in the subtree rooted at them. In this case, these objects must continue to exist in the hybrid cloud cache until the related transactions are completed. Secondly, there are no outstanding Explicit transactions on these objects or on objects in the subtree. Embodiments described herein include data, metadata, and meta-file processing and logic to address these two cases.

In some embodiments, a local hybrid cloud cache maintains and stores folders in a metadata file system (MDFS), which is a structured hierarchy or tree of cached folders comprising the user visible namespace(s). Additionally, the MDFS may also comprise a set of meta-namespaces for internal use. At each level in the MDFS, the hybrid cloud cache maintains a meta-file that contains metadata for folders and files within each folder.

Periodically, the hybrid cloud cache obtains a new meta-file from the cloud and compares the new meta-file with the current meta-file version in the hybrid cloud cache. This is done to determine the Implicit metadata transactions that have occurred in the cloud (and may not yet have been noted in the cache). If the comparison finds that some objects are not in the new meta-file, then it can be because the objects have been moved to another location in the cloud or that the objects have been deleted in the cloud.

Conventionally, the way to distinguish between the two possibilities when the comparison finds that an object is not in the new meta-file is to query the cloud, which is a high-latency operation. Moreover, if the object has been moved to another location, the new location may not be known to the hybrid cloud cache. If there are outstanding Explicit transactions to be performed on objects or on objects in a related subtree, then these objects must continue to exist in the hybrid cloud cache until the transactions are completed in order for the objects to be acted upon. Addressing and resolving the potential problems that can arise in these situations is one goal of the system, apparatuses, and methods disclosed herein.

In systems that incorporate a hybrid cloud cache, there are several types of events which can trigger this meta-file fetch by the cache from the cloud. When Explicit transactions are pushed to cloud, a refresh of the parent folder (or parent folders, in case of move file/folder) involved is scheduled. When Implicit transactions occur in the cloud, the hybrid cloud cache is notified about the list of folders involved in the changes, and the hybrid cloud cache schedules a refresh. In addition to these two types of events, a hybrid cloud cache may also schedule a refresh for those folders whose last refresh time sufficiently in the past.

While current technologies and methodologies for managing systems that incorporate a hybrid cloud cache provide for many benefits and efficiencies, such technologies and methodologies still have shortcomings. Embodiments of the system, apparatuses, and methods described herein are directed to processes and techniques to provide enhanced and optimized caching performance, along with enhanced data consistency and integrity.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

As will be described, current methodologies and technologies used in managing a hybrid cloud computing architecture or other system that includes a hybrid cloud cache may be modified and/or enhanced by using an embodiment of the system, apparatuses, and methods described herein to provide enhanced and optimized caching performance, along with enhanced data consistency and integrity. Such enhancements and improvements to conventional methodologies and technologies may provide for improved efficiency, improved data consistency, improved data integrity, improved speed, improved caching capabilities, improved handling of Implicit transactions, improved long-term and short-term performance, reduced costs, and increased ease-of-use.

A system and accompanying methods for handling Implicit transactions in a system incorporating a hybrid cloud cache are disclosed. In some embodiments, the system and methods handle Implicit transactions that may impact a hybrid cloud cache through the creation of a specialized portion of the hybrid cloud cache, termed an "orphanage" herein. The orphanage of a hybrid cloud cache may comprise a separate internal meta-namespace for objects that are associated with Implicit metadata transactions occurring in the cloud (e.g., move/rename or delete operations). In some embodiments, objects sent to the orphanage stay in the orphanage until all Explicit transactions on them (or that may impact them) are completed in the hybrid cloud cache.

In some embodiments, the system and methods also introduce an orphanage processor, which at regular intervals queries the cloud and transfers these objects (those associated with Implicit metadata transactions) to a "purgatory" (i.e., a temporary storage location) portion of the hybrid cloud cache in a situation where the system and methods determine that the objects have been deleted in the cloud. Additionally, the objects that may have moved to a new location in the cloud may be reclaimed from the orphanage if (or when) the new location information is cached by the hybrid cloud cache.

As a further description of the operation of the system and methods, assume that an object exists in a hybrid cloud cache inside the orphanage. The object may have been deleted from the cloud, and the hybrid cloud cache needs to determine if it has been deleted in the cloud. The orphanage processor queries the cloud using the identifier of the object. If the response from cloud is "no such object exists", this tells the orphanage processor that it is deleted. If the orphanage processor determines that the object has been deleted in the cloud, then the orphanage processor transfers the object to the purgatory of the hybrid cloud cache. Eventually, the object will be removed from the purgatory and at that point the object will not exist in the hybrid cloud cache.

In one embodiment, a system for handling Implicit transactions in a hybrid cloud cache is disclosed. The system may include a memory that stores a set of computer-executable instructions. When the instructions are executed by a processor or processors, the instructions cause the processor or processors (or a device or apparatus in which the processor or processors are contained) to perform one or more operations or functions of the system, where the operations or functions may include:
  maintaining folders in a metadata file system (MDFS) that includes a hierarchy of cached folders;
    where the file system maintains a meta-file containing metadata of objects, such as files and folders;
  at selected time intervals or based on the occurrence of a specific event, perform an operation that includes fetching a version of a meta-file from the cloud;
    the fetching may be performed by utilizing a cache refresh manager of a hybrid cloud cache;
  comparing the version of the meta-file fetched from the cloud to a version of the meta-file stored in the hybrid cloud cache;
  transferring an object (e.g., a folder) associated with an Implicit metadata transaction (i.e., a metadata transaction performed directly in the cloud as opposed to using the hybrid cloud cache) to an orphanage of the hybrid cloud cache if the comparison indicates that:
    the object is present only in the version of the meta-file stored in the hybrid cloud cache; or
    the object is present in both versions of the meta-file and the name does not match; or
    the object is present only in the version of the meta-file fetched from the cloud and the object is cached by the hybrid cloud cache;
  conducting a bottom-up traversal of an orphanage namespace;
    including aborting the bottom-up traversal of the orphanage namespace if an outstanding Explicit transaction for the object is present or the object still exists in a cloud namespace;
    moving the object to a purgatory of the hybrid cloud cache if the outstanding Explicit transaction for the object is not present and the object does not still exist in the cloud namespace.

In another embodiment, a method for handling Implicit transactions in a system that incorporates a hybrid cloud cache is disclosed. In some embodiments, the method may include:
  maintaining folders in a metadata file system (MDFS) that includes a hierarchy of cached folders;
    where the file system maintains a meta-file containing metadata of objects, such as files and folders;
  at selected time intervals or based on the occurrence of a specific event, perform an operation that includes fetching a version of a meta-file from the cloud;
    the fetching may be performed by utilizing a cache refresh manager of a hybrid cloud cache;

comparing the version of the meta-file fetched from the cloud to a version of the meta-file stored in the hybrid cloud cache;

transferring an object (e.g., a folder) associated with an Implicit metadata transaction (i.e., a metadata transaction performed directly in the cloud as opposed to using the hybrid cloud cache) to an orphanage of the hybrid cloud cache if the comparison indicates that:

the object is present only in the version of the meta-file stored in the hybrid cloud cache; or the object is present in both versions of the meta-file and the name does not match; or the object is present only in the version of the meta-file fetched from the cloud and the object is cached by the hybrid cloud cache;

conducting a bottom-up traversal of an orphanage namespace;

including aborting the bottom-up traversal of the orphanage namespace if an outstanding Explicit transaction for the object is present or the object still exists in a cloud namespace;

moving the object to a purgatory of the hybrid cloud cache if the outstanding Explicit transaction for the object is not present and the object does not still exist in the cloud namespace.

According to yet another embodiment, a set of computer-executable instructions for handling Implicit transactions in a system that incorporates a hybrid cloud cache is disclosed. The set of instructions, when executed by a processor or processors, may cause the processor or processors (or a device or apparatus in which the processor or processors are contained) to perform functions or operations including:

maintaining folders in a metadata file system that includes a hierarchy of cached folders;

where the file system maintains a meta-file containing metadata of objects, such as files and folders;

at selected time intervals or based on the occurrence of a specific event, perform an operation that includes fetching a version of a meta-file from the cloud;

the fetching may be performed by utilizing a cache refresh manager of a hybrid cloud cache;

comparing the version of the meta-file fetched from the cloud to a version of the meta-file stored in the hybrid cloud cache;

transferring an object (e.g., a folder) associated with an Implicit metadata transaction (i.e., a metadata transaction performed directly in the cloud as opposed to using the hybrid cloud cache) to an orphanage of the hybrid cloud cache if the comparison indicates that:

the object is present only in the version of the meta-file stored in the hybrid cloud cache; or the object is present in both versions of the meta-file and the name does not match; or the object is present only in the version of the meta-file fetched from the cloud and the object is cached by the hybrid cloud cache;

conducting a bottom-up traversal of an orphanage namespace;

including aborting the bottom-up traversal of the orphanage namespace if an outstanding Explicit transaction for the object is present or the object still exists in a cloud namespace;

moving the object to a purgatory of the hybrid cloud cache if the outstanding Explicit transaction for the object is not present and the object does not still exist in the cloud namespace.

These and other features of the systems and methods for handling implicit transactions in a hybrid cloud cache are described in the following detailed description, drawings, and appended claims. Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

DETAILED DESCRIPTION

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

The disclosed system and accompanying methods for handling Implicit transactions in a system incorporating a hybrid cloud cache may utilize a portion of the hybrid cloud cache, termed an "orphanage" herein. The orphanage may comprise a separate internal meta-namespace for objects that are associated with Implicit metadata transactions occurring in the cloud. In some embodiments, objects sent to the orphanage stay in the orphanage until all Explicit transactions on them (or that may impact them) are completed in the hybrid cloud cache. In some embodiments, the system and methods also introduce an orphanage processor, which at regular intervals queries the cloud and transfers these objects (those associated with Implicit metadata transactions) to a "purgatory" (temporary storage location) portion of the hybrid cloud cache in a situation where the system and methods determine that the objects have been deleted in the cloud. The objects that may have moved to a new location in the cloud may be reclaimed from the orphanage if (or when) the new location information is cached by the hybrid cloud cache.

In some embodiments, the hybrid cloud cache may keep folders in a metadata file system (MDFS), which may be a structured hierarchy or tree of cached folders. At each level in the MDFS, the hybrid cloud cache may maintain a meta-file that contains metadata for folders and files that are within that folder. In some embodiments, and in some cases triggered by a specific event (examples of which are described herein), a cache refresh manager of the hybrid cloud cache may fetch a version of a meta-file from the cloud and compare the version with a current version of the meta-file stored in the hybrid cloud cache. The comparison of the two meta-files may be used to indicate which objects are to be selected as candidates for transfer to the orphanage.

Objects may be candidates for transfer to the orphanage if they meet one or more of the following criteria, provided the situation is not caused by the cache pushing its own Explicit transaction to the cloud:
 1. The object is present only in the meta-file version from the hybrid cloud cache;
 2. The object is present in both meta-files, but the name does not match; or
 3. The object is present only in the meta-file version from the cloud and the object is also cached by the hybrid cloud cache. As an example of how this situation might occur, assume that an object path is "/Shared/Design/Documents" and its identifier is ID1. The object is also cached. The following Implicit transaction happens in cloud: Move "/Shared/Design/Documents" to "/Shared/Construction/Documents". The hybrid cloud cache fetches the meta-file for "/Shared/Construction" and finds that the object "Documents" with ID1 is present in the new meta-file. The hybrid cloud cache knows that the object with ID1 is cached (from #1) but the location is different.

When an object is moved to the orphanage using the disclosed system and methods, its unique identifiers are used as its name to avoid name conflicts that may be caused by the presence of objects with the same name at different levels in the MDFS hierarchy.

The orphanage processor described herein is an entity that operates at a regular interval (which is configurable, but may be set to a default value of, for example, 1 hour) and performs a bottom-up traversal of the orphanage (internal) namespace, during which it performs the following processes or "checks" on each leaf object in the namespace hierarchy:
 1. Determines if there are there any outstanding Explicit Transactions involving the object; and
 2. Determines if the object still exists in the cloud namespace.

If both determinations return a negative response, then the orphanage processor moves the leaf object to the purgatory of the hybrid cloud cache. Otherwise, the object is left as is in the orphanage and the bottom-up traversal is aborted.

From one perspective, the functioning of the orphanage processor can be represented as:
 if outstanding Explicit transactions involving the object are present, or the object still exists in the cloud namespace, then abort the bottom-up-traversal; else
 if the object does not exist in cloud namespace, then move the object to the purgatory of the hybrid cloud cache.

In some embodiments, a meta-data cache manager that is used as part of the process for caching new objects may check for an object's existence in the orphanage. If the object is found in the orphanage, then the system and methods may reclaim the object from the orphanage and transfer it to its new location in the hybrid cloud cache that matches with its location in the cloud.

The described system and methods provide a concept of an orphanage as a separate internal namespace for objects whose existence or location in the cloud namespace is not known to a hybrid cloud cache. Additionally, the system and methods provide the ability to reclaim objects from the orphanage and transfer the reclaimed objects to the correct location when needed. Further, the system and methods provide an orphanage processor which determines the correct placement for orphaned objects if such objects do not exist in the cloud. The system and methods also provide the ability to move objects back and forth between the orphanage and a user-visible namespace in the presence of Explicit transactions as well as the ability to complete those transactions without violating the transactional integrity of the hybrid cloud cache.

Figure 1:
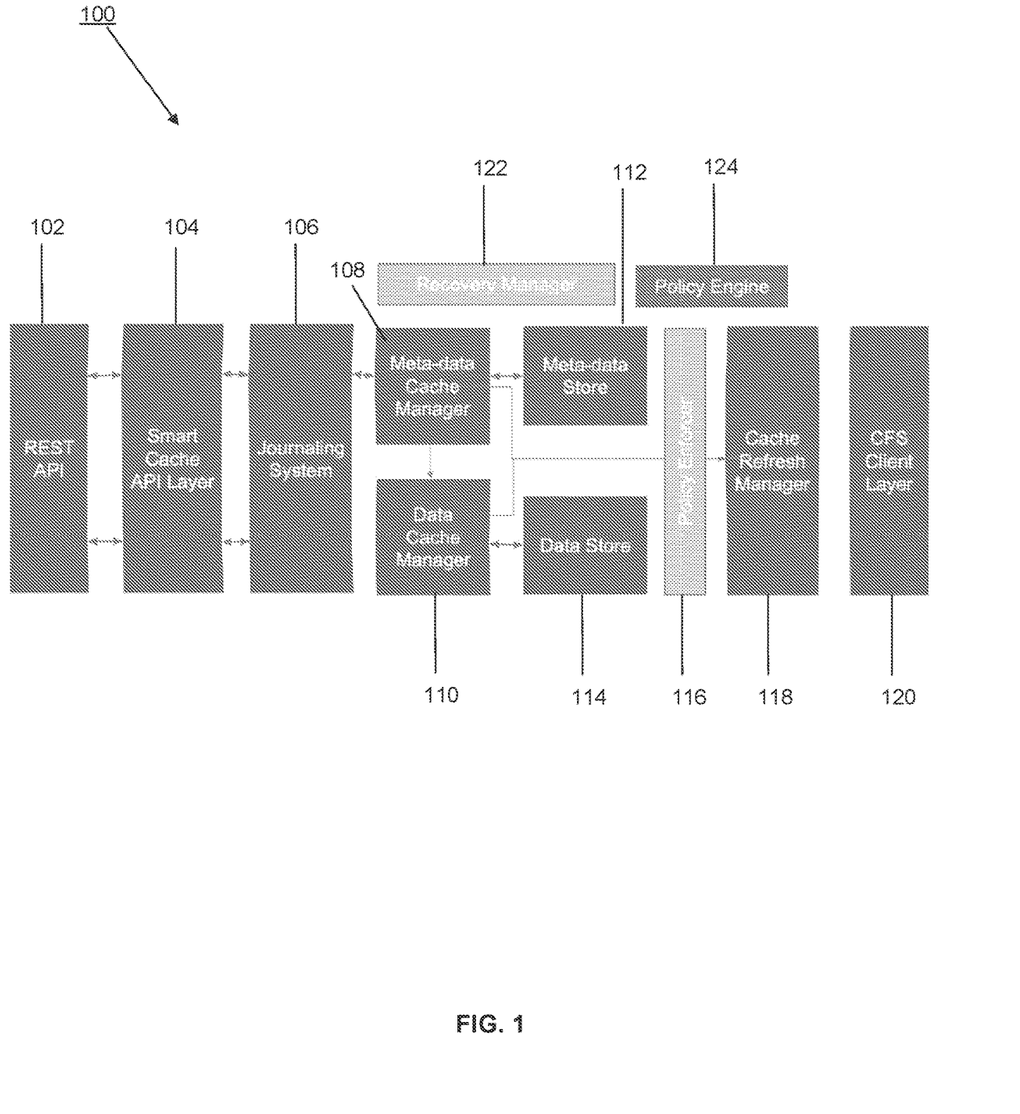
FIG. 1 is a schematic diagram illustrating a system including components for supporting functionality for handling implicit transactions in a hybrid cloud cache, in accordance with some embodiments.
Figure 2:
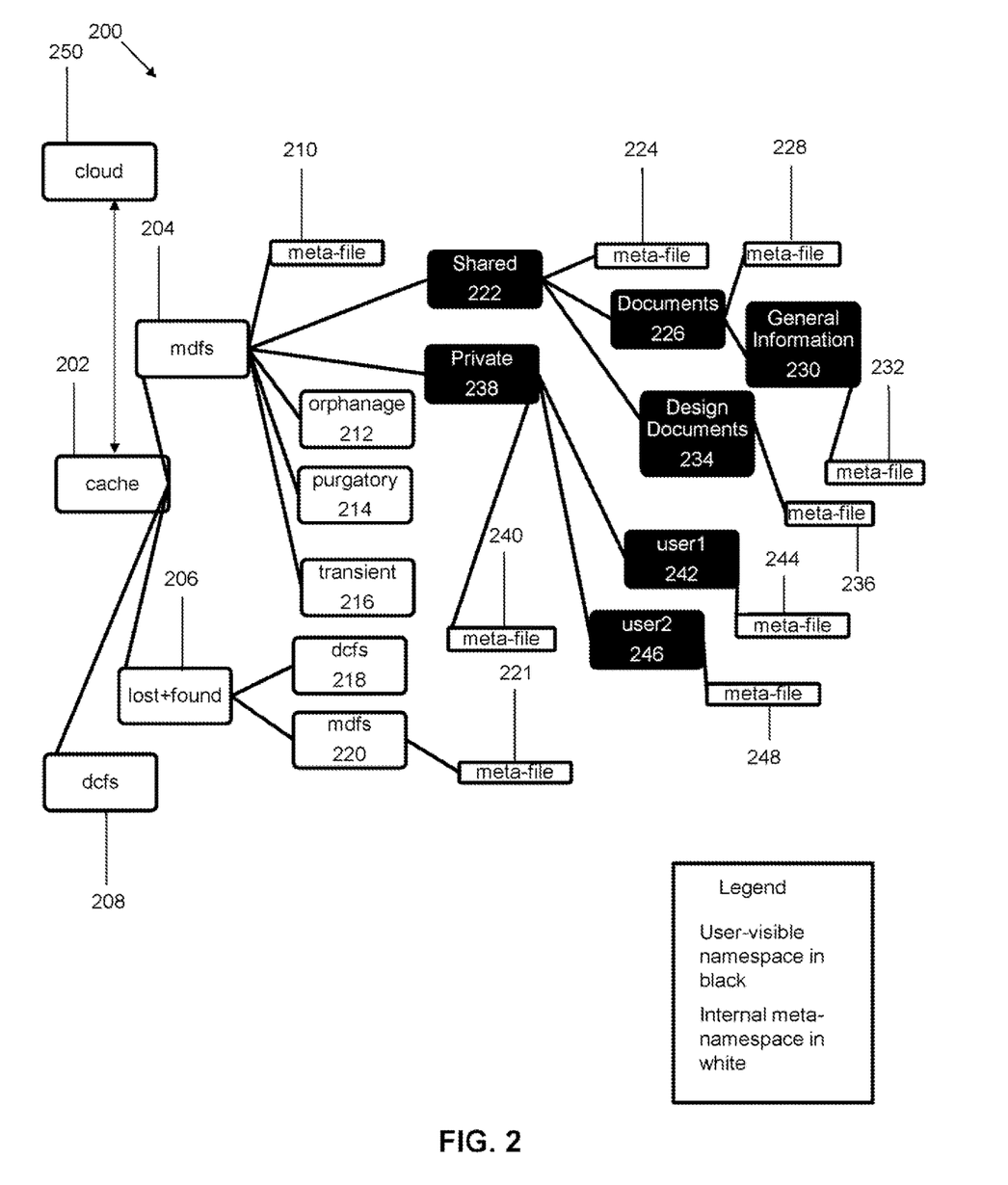
FIG. 2 is a schematic diagram illustrating a system including additional components for supporting the functionality of the system of FIG. 1, in accordance with some embodiments.

With reference to FIGS. 1 and 2, the system (element 100 in FIG. 1) and methods handle Implicit transactions in a hybrid cloud cache using a portion of the hybrid cloud cache, referred to as an orphanage (element 212 of FIG. 2). The orphanage 212 of the hybrid cloud cache may comprise a separate internal meta-namespace for objects that are associated with Implicit metadata transactions of the cloud 250. In some embodiments, objects sent to the orphanage 212 stay in the orphanage until all Explicit transactions involving them are completed in the hybrid cloud cache.

The system 100 and methods also introduce an orphanage processor, which at regular intervals queries the cloud and transfers these objects to a purgatory (element 214 of FIG. 2) of the hybrid cloud cache if the system 100 and methods determine that the objects have been deleted in the cloud 250. Additionally, the objects that may have moved to a new location in the cloud 250 may be reclaimed from the orphanage 212 if (or when) the new location is cached by the hybrid cloud cache.

As an example of this situation, assume an object ID1 is in the orphanage. The object ID1 exists in the cloud in a location "/Shared/Documents/Reservations". A user tries to perform an operation on "/Shared/Documents/Reservation". The hybrid cloud cache finds that it has cached "/Shared/Documents" but not "/Shared/Documents/Reservation". The hybrid cloud cache tries to cache "/Shared/Documents/Reservation" and finds that it already has an object with ID1 in the orphanage and moves it from Orphanage to the new-location "/Shared/Documents/Reservation. This step is referred as a "reclaim".

A hybrid cloud cache may keep folders in the MDFS (e.g., MDFS element 204 in FIG. 2), which may be a structured hierarchy or tree of cached folders. At each level in the MDFS, the hybrid cloud cache may maintain a meta-file (e.g., meta-file 210 of FIG. 2) that contains metadata for folders and files that are within that folder. In some embodiments, a cache refresh manager (element 118 of FIG. 1) of the hybrid cloud cache may fetch a new copy of meta-file from the cloud 250 and compare the new copy with a current copy in the hybrid cloud cache. The cache refresh (fetch) operation may occur at scheduled times, regularly at an interval set in advance or due to execution of specific logic, or in response to a specific event or set of events (examples of which are described herein), for example.

As mentioned, the comparison of current and new meta-files is used to identity which objects are selected for transfer to the orphanage 212. An object may be a candidate for transfer to the orphanage if they meet any of the following criteria, provided the situation is not caused by a cache pushing its own Explicit transaction to the cloud 250:
    the object is present only in the current copy of the meta-file from the hybrid cloud cache; or
    the object is present in both meta-file copies, but the name does not match; or
    the object is present only in the new copy from the cloud 250 and the object is also cached by the hybrid cloud cache.

When the object(s) are moved to the orphanage 212 using the described system and methods, their unique identifiers may be used as their name(s) to avoid name conflicts that may be caused by the presence of objects with the same name at different levels in the hierarchy.

The orphanage processor may be an element or process that operates at a regular interval and performs a bottom-up traversal of the orphanage namespace. The orphanage processor may cause the following checks or evaluations to be performed for each leaf object in the namespace tree or hierarchy:
    are there any outstanding Explicit transactions involving the object?; and
    does the object still exist in the cloud namespace?

If both inquiries (checks) return a negative response, then the orphanage processor moves the leaf object to the purgatory 214 of the hybrid cloud cache. Otherwise, the object is left as is in the orphanage 212 and the bottom-up traversal is aborted. As mentioned, the function of the orphanage processor can also be represented as:
    if an outstanding Explicit transaction is present or the object still exists in the cloud namespace, then abort the bottom-up-traversal; else
    if the object does not exist in cloud namespace, then move the object to the purgatory 214 of the hybrid cloud cache.

In some embodiments, a metadata cache manager 108 used as part of a process for caching new objects may check for an object's existence in the orphanage 212. If the object is found, then the system and methods may reclaim the object from the orphanage 212 and transfer the object to its new location in the hybrid cloud cache, where that new location matches its location in the cloud 250.

FIG. 1 is a schematic diagram illustrating a system including components for supporting functionality for handling implicit transactions in a hybrid cloud cache, in accordance with some embodiments. The system 100 may be configured to perform any of the functionality described herein. The system 100 may be configured to support, but is not limited to supporting, caching services, hybrid cloud services, cloud services, transaction system services, content collaboration services, error handling services, content delivery services, monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and any other computing applications and services.

In some embodiments, the system 100 may be included within another system, may be a separate system from another system, and/or may be a subsystem of another system. System 100 may be implemented, at least in part, as a set of computer-executable instructions that when executed by a suitably programmed processor, cause the processor or a server or device of which the processor is a part, to perform one or more of the methods, functions, operations, or processes described herein.

The system 100 may include, but is not limited to including, a REST Application Programming Interface (API) 102 (or other API), a smart cache API layer 104 (or other API layer), a journaling system 106 (which may include any number of journals), a metadata cache manager 108, a data cache manager 110, a metadata store 112, a data store 114, a policy enforcer 116, a cache refresh manager 118, a cloud-file-storage (CFS) client layer 120, a recovery manager 122, and a policy engine 124. The system 100 may include a hybrid cloud cache that may utilize the various components of the system 100 and may communicatively link and upload data to and/or download data from a cloud system. The REST API 102 may serve as the interface between user devices and/or other devices and applications supporting the functionality of the system 100. The REST API 102 may be configured to receive API calls from clients (e.g., to access a cache and/or to perform other functions), such as from user devices. The smart cache API layer 104 may serve as an intermediary between the REST API 102 and the journaling system 106 and the other components of the system 100, such as, but not limited to, the cloud-file-storage system and/or other components or applications of the system 100.

The journaling system 106 may include one or more journals. One or more of the journals may be configured to record transactions associated with operations requested by a user (including, for example, data and metadata associated with the operations). The metadata may be information that describes the data and/or operations, what is in the data, and/or the type of operation. In some embodiments, the journals may be a circular log, buffer, and/or other data structure.

In some embodiments, the journals may transfer records containing information associated with the operations to the cloud, such as to a cloud-based platform or system. Once the records are transferred to the cloud, the records may be deleted from (or overwritten in) the journal(s). The journal(s) may be utilized to ensure that the operations requested by users/clients are carried out and performed, even if the system 100 crashes or suffers another type of interruption. Data and metadata associated with the operations may be managed by the data cache manager 110 and the metadata cache manager 108, respectively. In some embodiments, the records including the data and metadata may be stored in the data store 114 and the metadata store 112, respectively.

The system 100 may include a policy enforcer 116, which may be configured to enforce the policies and rules associated with the system 100. The cache refresh manager 118 may be configured to refresh any cache in the system 100. For example, the cache refresh manager 118 may be configured to ensure that data and/or metadata recently stored in a particular cache is current and/or accurate. The system 100 may also include a cloud-file-storage system client layer 120, which may be utilized to facilitate the providing of the records associated with the operations from the journal(s) to a cloud-file-storage system (e.g., the cloud system). Additionally, the system 100 may include a recovery manager 122, which may be configured to recover lost data and/or metadata and ensure that the integrity of the data in the journals and/or caches of the system 100 is preserved. The system 100 may further include a policy engine 124, which may be configured to generate and/or conduct various operations associated with policies and/or rules to be utilized with the system 100.

With regards to policy engine 124, examples of policies that may be implemented by the engine include but are not limited to, or required to include the following:
a) Storage Management policies (e.g., how much disk space should be used by the cache);
b) Caching policies—what should be cached, what part of cache should be updated and when; and
c) Eviction policies—What should be evicted/removed from cache if there is a need to do so.

In some embodiments, one or more policies may be implemented in whole or in part by a rule-base, a trained machine learning model, or other decision process.

Referring now to FIG. 2, which is a schematic diagram illustrating a system including additional components for supporting the functionality of the system of FIG. 1, in accordance with some embodiments. FIG. 2 illustrates an example architecture for a metadata file system 200 for use with the system 100. The system 200 may be configured to perform the functionality described herein and may represent an on-disk structure illustrative of how the hybrid cloud cache system 100 of FIG. 1 stores its data and/or metadata.

The system 200 may include a cache 202 for storing data, files and/or folders, a DCFS (data cache file system) 208 of the cache 202 for storing files and/or data, a MDFS (metadata file system) 204 of the cache 202 for storing metadata (for all objects in the cache, except those in the Lost+Found), a meta-file 210 of the MDFS 204 for storing metadata associated with files and/or data, an orphanage 212 for providing a separate internal meta-namespace for objects that are associated with Implicit metadata transactions, a purgatory 214 for providing a location to which are transferred objects deleted from the cloud, a transient area 216 for data for files not yet transferred to the cloud, a Lost+Found subsystem 206, a DCFS 218 of the Lost+Found subsystem 206, a MDFS 220 of the Lost+Found subsystem 206 (for metadata for the objects in the Lost+Found), a meta-file 221 of the Lost+Found subsystem 206, a shared portion 222, a meta-file 224 of the shared portion 222, documents 226 of the shared portion 222, a meta-file 228 of the documents 226, general information 230, a meta-file 232 of the general information 230, design documents 234, a meta-file 236 of the design documents 234, a private portion 238, a meta-file 240 of the private portion 238, a user1 242, a meta-file 244 associated with the user1 242, a user2 246, a meta-file 248 associated with the user2 246, and a cloud 250 (i.e., a cloud-based platform or data storage).

Folders 222, 226, 230, 234, 238, 242, and 246 are examples of user folders in the namespace. There can be any number of such folders arranged in a hierarchy. The figure shows them as examples to demonstrate that for each user folder a meta-file is created in the hybrid cloud cache which stores the metadata associated with that folder.

It should be noted that the elements, components, or processes illustrated in FIG. 2 as being in the shared portion 222 and in the private portion 238 are designated as such for purposes of an example, and are not intended to be limited to the specific files, documents, and/or other components associated with each shown in FIG. 2. In other examples, the shared portion 222 and/or the private portion 238 may have any number of user-desired folder-hierarchies inside the shared portion 222 and/or the private portion 238.

User1 242 and User2 246 may be humans, computing devices, programs, processes, clients, robots, and/or other types of users. The meta-files 210, 221, 224, 228, 232, 236, 240, 244, and 248 may serve as files that describe data, files and/or folders associated with the corresponding component of the system 200 to which they are connected. In some embodiments, the meta-files 210, 221, 224, 228, 232, 236, 240, 244, and 248 may include attributes, such as, but not limited to, name, size, user, number of versions, upload-time, another attribute, or a combination thereof.

In some embodiments, the white boxes to the left of the black boxes in FIG. 2 may form a part of an internal meta-namespace of the hybrid cloud cache of the system 100 that is not visible to users/clients. In some embodiments, the black boxes in FIG. 2 may form a part of a user-visible namespace that is visible to users/clients.

Figure 3:
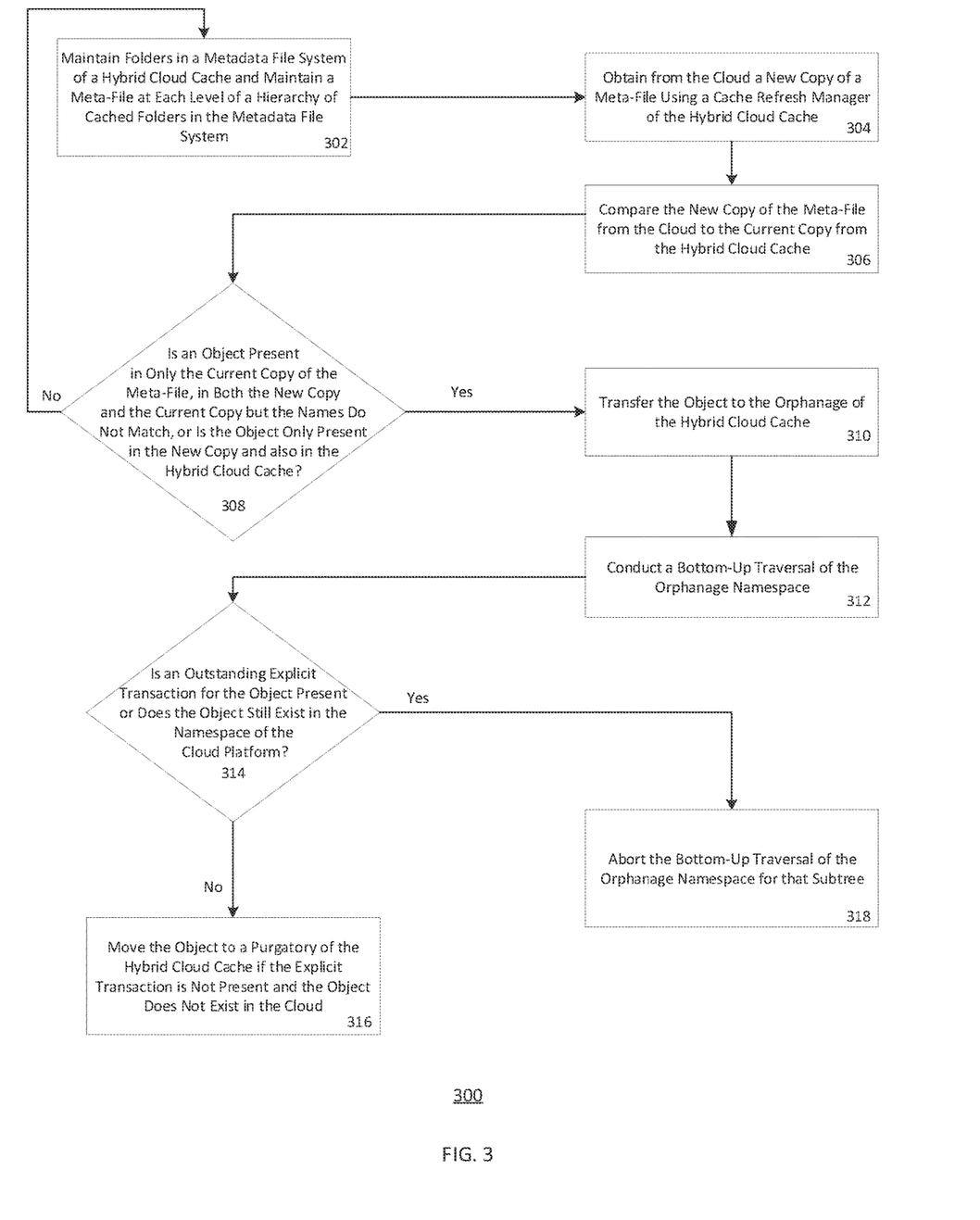
FIG. 3 is a flow chart or flow diagram illustrating an example method for handling Implicit transactions in a hybrid cloud cache, in accordance with some embodiments.

Operatively, the system 100 and/or system 200 may operate as described with reference to the method 300 shown in FIG. 3. A combination of the components, devices, programs, or networks of the system 100 and/or system 200 may execute and/or implement the operations or functions described herein. As shown in FIG. 3, an exemplary method 300 for handling Implicit transactions in a hybrid cloud cache may include one or more of the steps or stages shown, with one or more of the steps being optional in some examples.

In some embodiments, the method 300 may proceed as follows:

At step 302, the method 300 may include maintaining folders in a MDFS of a hybrid cloud cache and maintaining a meta-file at each level of a hierarchy of cached folders maintained in the MDFS of the hybrid cloud cache;

The meta-file may include metadata for folders, files, and/or other objects within a particular folder associated with a level of the hierarchy;

At step 304, the method 300 may include fetching, from a cloud (e.g. cloud 250), a new copy of a particular meta-file corresponding to a particular level in the hierarchy of folders;

In some embodiments, the cache refresh manager 118 of the hybrid cloud cache may perform the fetching of the new copy of the meta-file;

In some embodiments, the fetching may be performed at selected time intervals and/or in response to a particular event;

At step 306, the method 300 may include comparing the new copy of the meta-file from the cloud to the current copy of the meta-file from the hybrid cloud cache;

The comparison may involve comparing the information in each of the meta-files pertaining to one or more objects referenced in the meta-files;

At step 308, the method 300 may include determining if an object associated with an Implicit metadata transaction is present only in the current copy of the meta-file, or if the object is present in both the new copy of the meta-file and the current copy of the meta-file but the names of the objects do not match, or if the object is present only in the new copy of the meta-file and is also cached in the hybrid cloud cache;

If the outcome of the determination in step 308 is the "No" branch, then the method 300 may proceed back to step 302 and again to step 304;

If the outcome of the determination in step 308 is the "Yes" branch, then the method 300 may proceed to step 310, which may include transferring the object to an orphanage 212 of the hybrid cloud cache;

In some embodiments, the orphanage 212 may be a separate internal-meta namespace for objects that are associated with Implicit metadata transactions;

when moving an object (and meta-file) to the orphanage 212, a unique identifier may be used to replace the name of the object to avoid name conflicts that may be caused by the presence of objects with the same name at different levels in the cache hierarchy;

The method 300 may then proceed to step 312, which may include conducting a bottom-up traversal of the orphanage namespace, such as by utilizing the orphanage processor element or process described herein;

At step 314, the method 300 may include determining if an outstanding Explicit transaction involving the object is present, or if the object still exists in the cloud namespace;

If there is no outstanding explicit transaction for the object and the object does not exist or no longer exists in the cloud (the "No" branch of step 314), then the method 300 may proceed to step 316, which may include moving the object to a purgatory 214 of the hybrid cloud cache;

In some embodiments, the purgatory 214 may serve as a resting place for objects that have been permanently deleted in the cloud;

If at step 314 it is determined that there is an outstanding Explicit transaction to be conducted for the object that is present in the cache, or that the object still exists in the cloud namespace (the "Yes" branch of step 314), then the method 300 may proceed to step 318, which may include aborting the bottom-up traversal of the orphanage namespace for that subtree and leaving the object in the orphanage 212.

In some embodiments, steps or stages 302-310 may be performed by the cache refresh manager 118 as described herein, and steps or stages 312-318 may be performed by the orphanage processor as described herein. Further, the method 300 may continuously operate as additional transactions are received and/or processed by system 100 or system 200, and/or as new meta-files are generated in the systems and as updates are made in the systems. The method 300 may further incorporate any of the features and functionality described for the system 100, the system 200, another method disclosed, or as otherwise described herein.

Figure 4:
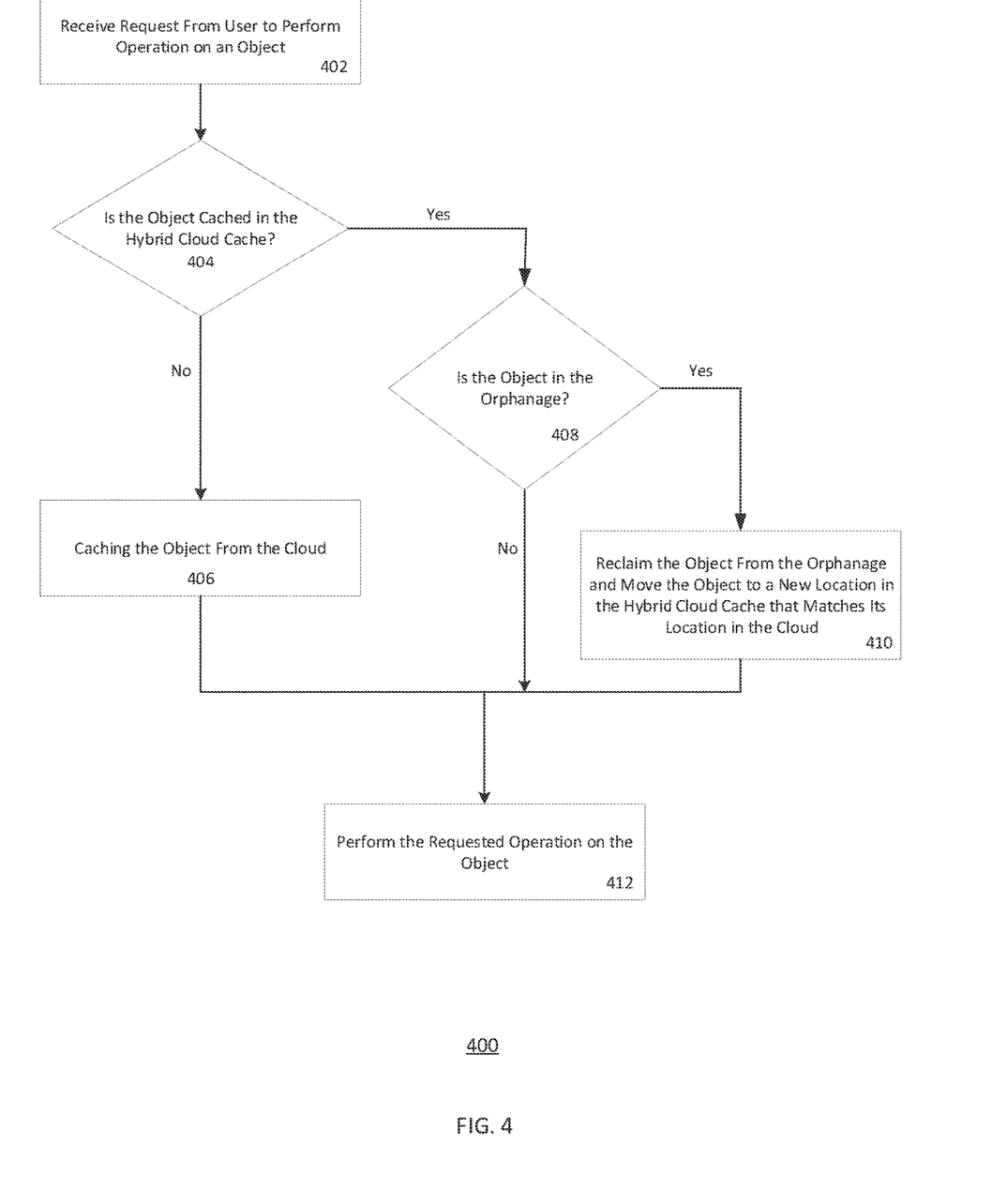
FIG. 4 is a flow chart or flow diagram illustrating an example method for reclaiming an object from an orphanage, in accordance with some embodiments.

FIG. 4 is a flow chart or flow diagram illustrating an example method 400 for reclaiming an object from an orphanage, in accordance with some embodiments. A combination of the components, devices, programs, or networks of the system 100 and/or system 200 may execute and/or implement the operations or functions described in the following with reference to FIG. 4:

At step 402, the method 400 may include receiving a request form a user to perform an operation on an object, such as a file or folder;

At step 404, the method 400 may include determining if the object is cached in the hybrid cloud cache;

If the object is not cached (corresponding to the "No" branch of step 404), then the method 400 may proceed to step 406, which may include caching the object from the cloud 250 (i.e., obtaining the object from the cloud-based platform);

If at step 404, the object is determined to be cached in the hybrid cloud cache (corresponding to the "Yes" branch of step 404), then the method 400 may proceed to step 408, where at step 408, the method 400 may include determining if the object is in the orphanage 212 of the hybrid cloud cache;

In some embodiments, the metadata cache manager 108, as part of a process of caching new objects in the hybrid cloud cache, may check for their existence in the orphanage 212;

If the object is determined to be in the orphanage 212 of the hybrid cloud cache (the "Yes" branch of step 408), then the method 400 may proceed to step 410, where at step 410, the method 400 may include reclaiming the object from the orphanage 212 and moving the object to its new location in the hybrid cloud cache that matches its corresponding location in the cloud 250;

If at step 408, the object is determined to not be in the orphanage 212 (the "No" branch of step 408), then the method 400 may proceed to step 412, where at step 412, the method 400 may include performing the requested operation on the object that the user requested in step 402.

In some embodiments, the metadata cache manager 108 may perform steps 406 and 410. The method 400 may continuously operate as additional user requests are received and/or processed by the system 100, 200. Further, the method 400 may incorporate any of the features and functionality described for the system 100, the system 200, the method 300, another method disclosed, or as otherwise described herein.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover all adaptations or variations of various embodiments and arrangements of the system and methods described. Combinations of the above arrangements, and other arrangements not specifically described herein, will be apparent to those of skill in the art upon reviewing the above description. Therefore, it is intended that the disclosure not be limited to the particular arrangement(s) or embodiments disclosed, but include all embodiments and arrangements falling within the scope of the appended claims.

The foregoing is provided for purposes of illustrating, explaining, and describing one or more embodiments of the disclosure. Modifications and adaptations to these embodiments will be apparent to those skilled in the art and may be made without departing from the scope or spirit of this invention. Upon reviewing the embodiments, it would be evident to an artisan with ordinary skill in the art that said embodiments can be modified, reduced, or enhanced without departing from the scope and spirit of the claims described below.

What is claimed is:

1. A system, comprising:
   a set of computer-executable instructions; and
   a processor that executes the set of instructions, wherein when executed, the instructions cause the processor to:
   obtain a copy of a meta-file from a cloud platform, the meta-file including metadata associated with a set of files and folders in a namespace of the cloud platform;
   compare the copy of the meta-file obtained from the cloud platform to a copy of the meta-file obtained from a hybrid cloud cache;
   transfer an object associated with an implicit metadata transaction to an orphanage of the hybrid cloud cache in response to the comparing indicating that the two meta-files do not match; and
   interrupt a bottom-up traversal of an namespace tree associated with the orphanage in response to an outstanding explicit transaction for the object detected in the hybrid cloud cache or in response to the object detected in the namespace of the cloud platform.

2. The system of claim 1, wherein the set of instructions further comprises instructions that cause the processor to abort the bottom-up traversal of the orphanage namespace tree if an outstanding explicit transaction for the object is present in the hybrid cloud cache or if the object still exists in the namespace of the cloud platform.

3. The system of claim 1, wherein the set of instructions further comprises instructions that cause the processor to move the object to a purgatory of the hybrid cloud cache if the outstanding explicit transaction for the object is not present and the object does not exist in the namespace of the cloud platform.

4. The system of claim 1, wherein the set of instructions further comprises instructions that cause the processor to rename the object with a unique identifier when transferring the object to the orphanage.

5. The system of claim 1, wherein the set of instructions further comprises instructions that cause the processor to reclaim the object from the orphanage if the object has moved to a new location in the cloud and the new location is cached by the hybrid cloud cache.

6. The system of claim 1, wherein the set of instructions further comprises instructions that cause the processor to leave the object in the orphanage if an outstanding explicit transaction for the object is present or the object still exists in the namespace of the cloud platform.

7. The system of claim 1, wherein the set of instructions further comprises instructions that cause the processor to conduct the bottom-up traversal of the orphanage namespace at a selected time interval.

8. The system of claim 1, wherein the set of instructions further comprises instructions that cause the processor to conduct the bottom-up traversal of the orphanage namespace in response to detecting a specific event.

9. The system of claim 1, wherein the set of instructions further comprises instructions that cause the processor to remove the object from the orphanage if all of the explicit transactions for the object have been completed by the hybrid cloud cache and the object does not exist on the cloud platform.

10. The system of claim 1, wherein the set of instructions further comprises instructions that cause the processor to classify the outstanding explicit transaction as a metadata transaction or as a data transaction.

11. The system of claim 1, wherein the set of instructions further comprises instructions that cause the processor to obtain the copy of the meta-file from the cloud platform at a selected time interval.

12. A computer-implemented method, comprising:
    obtaining a copy of a meta-file from a cloud platform, the meta-file including metadata associated with a set of files and folders in a namespace of the cloud platform;
    comparing the copy of the meta-file obtained from the cloud platform to a copy of the meta-file obtained from a hybrid cloud cache;
    conducting a bottom-up traversal of a namespace tree of the orphanage of the hybrid cloud cache;
    transferring an object associated with an implicit metadata transaction to an orphanage of the hybrid cloud cache in response to the comparing indicating that the two meta-files do not match; and
    interrupting the bottom-up traversal of the orphanage namespace tree if an outstanding explicit transaction for the object is present in the hybrid cloud cache or if the object still exists in the namespace of the cloud platform.

13. The method of claim 12, further comprising moving the object to a purgatory of the hybrid cloud cache in response to determining that the outstanding explicit transaction for the object is not present and the object does not exist in the namespace of the cloud platform.

14. The method of claim 12, further comprising renaming the object with a unique identifier when transferring the object to the orphanage.

15. The method of claim 12, further comprising reclaiming the object from the orphanage if the object has moved to a new location in the cloud and the new location is cached by the hybrid cloud cache.

16. The method of claim 12, further comprising leaving the object in the orphanage if an outstanding explicit transaction for the object is present or the object still exists in the namespace of the cloud platform.

17. The method of claim 12, further comprising conducting the bottom-up traversal of the orphanage namespace at a selected time interval or conducting the bottom-up traversal of the orphanage namespace in response to detecting a specific event.

18. The method of claim 12, further comprising removing the object from the orphanage if all of the explicit transactions for the object have been completed by the hybrid cloud cache and the object does not exist on the cloud platform.

19. The method of claim 12, further comprising classifying the outstanding explicit transaction as a metadata transaction or as a data transaction.

20. The method of claim 12, further comprising fetching the copy of the meta-file from the cloud platform at a selected time interval.

* * * * *